(12) United States Patent
Kato

(10) Patent No.: US 12,371,525 B2
(45) Date of Patent: *Jul. 29, 2025

(54) HYDROGENATED BLOCK COPOLYMER COMPOSITION, METHOD FOR PRODUCING SAME, AND FILM

(71) Applicant: ZEON CORPORATION, Tokyo (JP)

(72) Inventor: Daisuke Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 630 days.

This patent is subject to a terminal disclaimer.

(21) Appl. No.: 17/754,145

(22) PCT Filed: Sep. 23, 2020

(86) PCT No.: PCT/JP2020/035805
§ 371 (c)(1),
(2) Date: Mar. 25, 2022

(87) PCT Pub. No.: WO2021/065623
PCT Pub. Date: Apr. 8, 2021

(65) Prior Publication Data
US 2022/0289890 A1   Sep. 15, 2022

(30) Foreign Application Priority Data

Sep. 30, 2019 (JP) ................. 2019-180127

(51) Int. Cl.
| | |
|---|---|
| C08F 297/04 | (2006.01) |
| C08F 6/12 | (2006.01) |
| C08F 8/04 | (2006.01) |
| C08J 5/18 | (2006.01) |
| C08L 53/02 | (2006.01) |

(52) U.S. Cl.
CPC ............. *C08F 297/046* (2013.01); *C08J 5/18* (2013.01); *C08F 2810/00* (2013.01); *C08J 2353/02* (2013.01)

(58) Field of Classification Search
None
See application file for complete search history.

(56) References Cited

U.S. PATENT DOCUMENTS

| | | |
|---|---|---|
| 3,333,024 A | 7/1967 | Haefele et al. |
| 3,485,787 A | 12/1969 | Haefele et al. |
| 4,501,857 A | 2/1985 | Kishimoto et al. |
| 4,673,714 A | 6/1987 | Kishimoto et al. |
| 4,891,410 A | 1/1990 | Bronstert et al. |
| 8,192,814 B2 | 6/2012 | Kuwahara et al. |
| 2010/0239802 A1* | 9/2010 | Kuwahara ............ C08L 53/025 428/36.9 |
| 2019/0077947 A1 | 3/2019 | Nojima et al. |

FOREIGN PATENT DOCUMENTS

| | | |
|---|---|---|
| CN | 101796131 A | 8/2010 |
| GB | 1020720 A | 2/1966 |
| JP | S428704 B1 | 4/1967 |
| JP | S436636 B1 | 3/1968 |
| JP | S59133203 A | 7/1984 |
| JP | S60220147 A | 11/1985 |
| JP | S63286413 A | 11/1988 |
| JP | H01182307 A | 7/1989 |
| JP | 2017119756 A * | 7/2017 |
| JP | 2020002296 A | 1/2020 |
| WO | 2017159800 A1 | 9/2017 |
| WO | 2018227173 A1 | 12/2018 |

OTHER PUBLICATIONS

Oct. 12, 2023, the Extended European Search Report issued by the European Patent Office in the corresponding European Patent Application No. 20870701.8.
Dec. 8, 2020, International Search Report issued in the International Patent Application No. PCT/JP2020/035805.
Apr. 5, 2022, International Preliminary Report on Patentability issued in the International Patent Application No. PCT/JP2020/035805.
Oct. 2, 2024, Communication pursuant to Article 94(3) EPC issued by the European Patent Office in the corresponding European Patent Application No. 20870701.8.

* cited by examiner

*Primary Examiner* — Ha S Nguyen
(74) *Attorney, Agent, or Firm* — KENJA IP LAW PC

(57) ABSTRACT

Provided is a hydrogenated block copolymer composition comprising a hydrogenated block copolymer A represented by General Formula (A) and a hydrogenated block copolymer B represented by General Formula (B), wherein the weight ratio (A/B) of the hydrogenated block copolymer A to the hydrogenated block copolymer B is 10/90 to 80/20, and the hydrogenation ratio of olefins in the polymer components constituting the hydrogenated block copolymer composition is 10 to 100%:

$$Ar1^a\text{-}HD^a\text{-}Ar2^a \quad (A)$$

$$Ar1^b\text{-}HD^b\text{-}Ar2^b \quad (B)$$

wherein in General Formulae (A) and (B) above, $Ar1^a$, $Ar1^b$, $Ar2^a$, and $Ar2^b$ are each an aromatic vinyl polymer block, $HD^a$ and $HD^b$ are each a hydrogenated polymer block of a conjugated diene polymer, and the ratio ($Mw(Ar2^a)/Mw(Ar1^a)$) of the weight average molecular weight of $Ar2^a$ ($Mw(Ar2^a)$) to the weight average molecular weight of $Ar1^a$ ($Mw(Ar1^a)$) is 2.6 to 66.

7 Claims, No Drawings

HYDROGENATED BLOCK COPOLYMER COMPOSITION, METHOD FOR PRODUCING SAME, AND FILM

TECHNICAL FIELD

The present invention relates to a hydrogenated block copolymer composition having a high elastic modulus, small permanent elongation, and high thermal stability, a method for producing the same, and a film prepared from such a hydrogenated block copolymer composition.

BACKGROUND ART

Traditionally, because of particularly high elasticity and softness, aromatic vinyl-conjugated diene-aromatic vinyl block copolymers, which are one of thermoplastic elastomers, are used as materials for stretch films used in sanitary goods such as disposable diapers and feminine hygiene products.

From the viewpoint of long-term use with safety, such stretch films should have both a high elastic modulus and small permanent elongation. Depending on their applications, these stretch films also should have high thermal stability.

For example, Patent Document 1 discloses a resin composition comprising a polypropylene resin (a) and a hydrogenated block copolymer (b), wherein the hydrogenated block copolymer (b) is a hydrogenated product of a block copolymer comprising a polymer block (A) mainly containing structural units derived from an aromatic vinyl compound and a polymer block (B) mainly containing structural units derived from isoprene, structural units derived from butadiene, or structural units derived from a mixture of isoprene and butadiene, and the hydrogenated block copolymer (b) has a glass transition temperature of −50 to −35° C.

RELATED ART

Patent Documents

Patent Document 1: International Publication No. WO 2017/159800

SUMMARY OF THE INVENTION

Problem to be Solved by the Invention

According to the technique disclosed in Patent Document 1, use of the hydrogenated block copolymer prepared by hydrogenating the block copolymer can provide a film having high thermal stability. However, the film prepared by the technique disclosed in Patent Document 1 has a problem of an increase in permanent elongation associated with the hydrogenation.

The present invention has been made in consideration of such circumstances, and an object of the present invention is to provide a hydrogenated block copolymer composition having a high elastic modulus, small permanent elongation, and high thermal stability. Another object of the present invention is to provide a method for producing such a hydrogenated block copolymer composition and a film prepared from such a hydrogenated block copolymer composition.

Means for Solving Problems

The present inventor, who has conducted research to achieve the above object, has found that a hydrogenated block copolymer composition comprising two hydrogenated block copolymers each having a specific structure has a high elastic modulus, small permanent elongation, and high thermal stability when the weight ratio of the two hydrogenated block copolymers each having a specific structure is controlled within a specific range and the hydrogenation ratio of olefins in the polymer components constituting the hydrogenated block copolymer composition is controlled within a specific range, and thus has completed the present invention.

In other words, the present invention provides a hydrogenated block copolymer composition comprising a hydrogenated block copolymer A represented by General Formula (A) and a hydrogenated block copolymer B represented by General Formula (B),
wherein the weight ratio (A/B) of the hydrogenated block copolymer A to the hydrogenated block copolymer B is 10/90 to 80/20, and
the hydrogenation ratio of olefins in the polymer components constituting the hydrogenated block copolymer composition is 10 to 100%:

  (A)

  (B)

(where in General Formulae (A) and (B), $Ar1^a$, $Ar2^a$, $Ar1^b$, and $Ar2^b$ are each an aromatic vinyl polymer block, $HD^a$ and $HD^b$ are each a hydrogenated polymer block of a conjugated diene polymer, and the ratio $(Mw(Ar2^a)/Mw(Ar1^a))$ of the weight average molecular weight of $Ar2^a$ ($Mw(Ar2^a)$) to the weight average molecular weight of $Ar1^a$ ($Mw(Ar1^a)$) is 2.6 to 66).

Preferably, in the hydrogenated block copolymer composition according to the present invention, $HD^a$ and $HD^b$ in General Formulae (A) and (B) above are each a hydrogenated polymer block of a conjugated diene polymer having a vinyl bond content of 1 to 80 mol %.

Preferably, in the hydrogenated block copolymer composition according to the present invention, the proportion of aromatic vinyl monomer units is 20 to 70% by weight in the total repeating units of the polymer components in the hydrogenated block copolymer composition.

Preferably, in the hydrogenated block copolymer composition according to the present invention, in General Formulae (A) and (B) above, $Ar1^a$, $Ar1^b$, and $Ar2^b$ each have a weight average molecular weight in the range of 2,000 to 40,000, and $HD^a$ and $HD^b$ each have a weight average molecular weight in the range of 15,000 to 300,000.

The present invention also provides a method for producing any one of the hydrogenated block copolymer compositions above, the method comprising (1) to (7):

(1): preparing a solution containing a terminally active aromatic vinyl polymer by polymerizing an aromatic vinyl monomer in a solvent in the presence of a polymerization initiator;

(2): preparing a solution containing a terminally active aromatic vinyl-conjugated diene block copolymer by adding a conjugated diene monomer to the solution containing a terminally active aromatic vinyl polymer prepared in (1), and polymerizing the conjugated diene monomer;

(3): preparing a solution containing a terminally active aromatic vinyl-conjugated diene-aromatic vinyl block copolymer by adding an aromatic vinyl monomer to the solution containing a terminally active aromatic vinyl-conjugated diene block copolymer prepared in (2), and polymerizing the aromatic vinyl monomer;

(4): preparing a solution containing a block copolymer B' by adding a polymerization terminator to the solution containing a terminally active aromatic vinyl-conjugated diene-aromatic vinyl block copolymer, which is prepared in (3), in an amount of less than 1 molar equivalent relative to the active terminal of the terminally active aromatic vinyl-conjugated diene-aromatic vinyl block copolymer to inactivate a portion of the active terminal;

(5): preparing a solution containing the block copolymer B' and a block copolymer A' by adding an aromatic vinyl monomer to the solution containing a block copolymer B' prepared in (4), and polymerizing the aromatic vinyl monomer;

(6): preparing a solution containing a hydrogenated block copolymer B and a hydrogenated block copolymer A by hydrogenating the solution containing the block copolymer B' and a block copolymer A' prepared in (5); and (7): recovering a hydrogenated block copolymer composition from the solution containing a hydrogenated block copolymer B and a hydrogenated block copolymer A prepared in (6).

Alternatively, the present invention provides a method for producing any one of the hydrogenated block copolymer compositions, the method comprising (1a) to ($6^a$):

(1a): preparing a solution containing a terminally active aromatic vinyl polymer by polymerizing an aromatic vinyl monomer in a solvent in the presence of a polymerization initiator;

(2a): preparing a solution containing a terminally active aromatic vinyl-conjugated diene block copolymer by adding a conjugated diene monomer to the solution containing a terminally active aromatic vinyl polymer prepared in (1a), and polymerizing the conjugated diene monomer;

(3a): preparing a solution containing a block copolymer B' by adding a bifunctional coupling agent to the solution containing a terminally active aromatic vinyl-conjugated diene block copolymer, which is prepared in (2a), in an amount such that the total amount of the functional groups is less than 1 molar equivalent relative to the active terminal thereof, to couple a portion of the terminally active aromatic vinyl-conjugated diene block copolymer;

(4a): preparing a solution containing the block copolymer B' and a block copolymer A' by adding an aromatic vinyl monomer to the solution containing a block copolymer B' prepared in (3a), and polymerizing the aromatic vinyl monomer;

(5a): preparing a solution containing a hydrogenated block copolymer B and a hydrogenated block copolymer A by hydrogenating the solution containing the block copolymer B' and a block copolymer A' prepared in (4a); and (6a): recovering a hydrogenated block copolymer composition from the solution containing a hydrogenated block copolymer B and a hydrogenated block copolymer A prepared in (5a).

The present invention further provides a film formed from any one of the hydrogenated block copolymer compositions.

Effects of Invention

The present invention can provide a hydrogenated block copolymer composition having a high elastic modulus, small permanent elongation, and high thermal stability. The present invention can also provide a method for producing such a hydrogenated block copolymer composition and a film prepared from such a hydrogenated block copolymer composition.

DESCRIPTION OF EMBODIMENTS

<Hydrogenated Block Copolymer Composition>

The hydrogenated block copolymer composition according to the present invention comprises a hydrogenated block copolymer A represented by General Formula (A) and a hydrogenated block copolymer B represented by General Formula (B).

The weight ratio (A/B) of the hydrogenated block copolymer A to the hydrogenated block copolymer B is 10/90 to 80/20.

The hydrogenation ratio of olefins in the polymer components constituting the hydrogenated block copolymer composition is 10 to 100%.

$$Ar1^a\text{-}HD^a\text{-}Ar2^a \qquad (A)$$

$$Ar1^b\text{-}HJD^b\text{-}Ar2^b \qquad (B)$$

In General Formula (A) above, $Ar1^a$ and $Ar2^a$ are each an aromatic vinyl polymer block, and the ratio ($Mw(Ar2^a)/Mw(Ar1^a)$) of the weight average molecular weight of $Ar2^a$ ($Mw(Ar2^a)$) to the weight average molecular weight of $Ar1^a$ ($Mw(Ar1^a)$) is 2.6 to 66. $HD^a$ is a hydrogenated polymer block of a conjugated diene polymer.

In General Formula (B) above, $Ar1^b$ and $Ar2^b$ are each an aromatic vinyl polymer block, and HJD is a hydrogenated polymer block of a conjugated diene polymer.

The aromatic vinyl polymer blocks $Ar1^a$, $Ar2^a$, $Ar1^b$, and $Ar2^b$ of the hydrogenated block copolymer A and the hydrogenated block copolymer B are polymer blocks comprising aromatic vinyl monomer units.

The aromatic vinyl monomer used to form aromatic vinyl monomer units can be any aromatic vinyl compound without limitation. Examples of aromatic vinyl compounds include styrene; styrenes substituted by an alkyl group, such as α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, and 5-t-butyl-2-methylstyrene; styrenes substituted by a halogen atom, such as 2-chlorostyrene, 3-chlorostyrene, 4-chlorostyrene, 4-bromostyrene, 2-methyl-4,6-dichlorostyrene, and 2,4-dibromostyrene; vinyl naphthalene; and the like. Among these, preferred is use of styrene. For each of the aromatic vinyl polymer blocks, these aromatic vinyl monomers can be used alone or in combination. For the aromatic vinyl polymer blocks, the same aromatic vinyl monomer may be used, or different aromatic vinyl monomers may be used.

In the hydrogenated block copolymer A and the hydrogenated block copolymer B, the aromatic vinyl polymer blocks $Ar1^a$, $Ar2^a$, $Ar1^b$, and $Ar2^b$ may contain monomer units other than the aromatic vinyl monomer units. Examples of the monomer units other than the aromatic vinyl monomer units include conjugated diene monomers such as 1,3-butadiene and isoprene (2-methyl-1,3-butadiene); α,β-unsaturated nitrile monomers; unsaturated carboxylic acid monomers or acid anhydride monomers thereof; unsaturated carboxylic acid ester monomers; non-conjugated diene monomers; and the like.

The content of the monomer units other than the aromatic vinyl monomer units in each aromatic vinyl polymer block is preferably 20% by weight or less, more preferably 10% by weight or less, particularly preferably substantially 0% by weight in the total aromatic vinyl polymer blocks.

The hydrogenated polymer blocks $HD^a$ and $HD^b$ of the conjugated diene polymers in the hydrogenated block copolymer A and the hydrogenated block copolymer B, respectively, are polymer blocks comprising conjugated diene monomer units, where at least part of the conjugated diene monomer units in the polymer blocks is hydrogenated.

The conjugated diene monomer used to form the conjugated diene monomer units can be any conjugated diene compound. Examples of the conjugated diene compound include 1,3-butadiene, isoprene, 2,3-dimethyl-1,3-butadiene, 2-chloro-1,3-butadiene, 1,3-pentadiene, 1,3-hexadiene, and the like. Among these, preferred is use of 1,3-butadiene and/or isoprene, and particularly preferred is use of isoprene. A conjugated diene polymer including a hydrogenated polymer block comprising isoprene units results in a hydrogenated block copolymer composition which ensures high flexibility and smaller permanent elongation. For each of the hydrogenated polymer blocks, these conjugated diene monomers can be used alone or in combination. For the hydrogenated polymer blocks, the same conjugated diene monomer may be used, or different conjugated diene monomers can be used.

The hydrogenated polymer blocks $HD^a$ and $HD^b$ of the conjugated diene polymers in the hydrogenated block copolymer A and the hydrogenated block copolymer B, respectively, may contain monomer units other than the conjugated diene monomer units. Examples of monomers which form the monomer units other than the conjugated diene monomer units include aromatic vinyl monomers such as styrene and α-methylstyrene; α,β-unsaturated nitrile monomers; unsaturated carboxylic acid monomers or acid anhydride monomers thereof; unsaturated carboxylic acid ester monomers; non-conjugated diene monomers; and the like.

The content of the monomer units other than the conjugated diene monomer units in each hydrogenated polymer block is preferably 20% by weight or less, more preferably 10% by weight or less, particularly preferably substantially 0% by weight in the total conjugated diene polymer blocks.

With respect to the hydrogenated block copolymer A in the hydrogenated block copolymer composition, the ratio ($Mw(Ar2^a)/Mw(Ar1^a)$) of the weight average molecular weight of $Ar2^a$ ($Mw(Ar2^a)$) to the weight average molecular weight of $Ar1^a$ ($Mw(Ar1^a)$) is in the range of 2.6 to 66. This means that the hydrogenated block copolymer A is a hydride of an asymmetric aromatic vinyl-conjugated diene-aromatic vinyl block copolymer composed of a sequence of the aromatic vinyl polymer block $Ar1^a$ having a relatively small weight average molecular weight, the hydrogenated polymer block $HD^a$ of the conjugated diene polymer, and the aromatic vinyl polymer block $Ar2^a$ having a relatively large weight average molecular weight in this order.

With respect to the hydrogenated block copolymer A, the ratio $Mw(Ar2^a)/Mw(Ar1^a)$ is in the range of 2.6 to 66, preferably 4 to 40, more preferably 4.5 to 35, still more preferably 4.5 to 17. A significantly small or large value of $Mw(Ar2^a)/Mw(Ar1^a)$ results in a hydrogenated block copolymer composition having large permanent elongation. In the present invention, the weight average molecular weight of the polymer or the polymer block is determined as a value against polystyrene standards in measurement by high performance liquid chromatography.

The weight average molecular weight ($Mw(Ar1^a)$) of the aromatic vinyl polymer block $Ar1^a$ having a relatively small weight average molecular weight, which is a constituent of the hydrogenated block copolymer A, is preferably 2,000 to 40,000, more preferably 2,500 to 30,000, still more preferably 3,000 to 10,000, particularly preferably 3,500 to 6,000. Control of $Mw(Ar1^a)$ within this range results in a hydrogenated block copolymer composition having smaller permanent elongation.

The weight average molecular weight ($Mw(Ar2^a)$) of the aromatic vinyl polymer block $Ar2^a$ having a relatively larger weight average molecular weight, which is a constituent of the hydrogenated block copolymer A, is preferably 5,000 to 250,000, more preferably 8,000 to 120,000, still more preferably 10,000 to 80,000, particularly preferably 15,000 to 65,000. Control of $Mw(Ar2^a)$ within this range results in a hydrogenated block copolymer composition having smaller permanent elongation.

The vinyl bond content (the proportion of 1,2-vinyl bonds and 3,4-vinyl bonds in the total conjugated diene monomer units) in the hydrogenated polymer block $HD^a$ of the conjugated diene polymer in the hydrogenated block copolymer A is usually 1 to 80 mol %, preferably 1 to 50 mol %, more preferably 1 to 50 mol %, still more preferably 1 to 30 mol %, further still more preferably 1 to 20 mol %, particularly preferably 2 to 15 mol %, most preferably 3 to 10 mol %. Control of the vinyl bond content within this range results in a block copolymer composition having smaller permanent elongation.

The weight average molecular weight ($Mw(HD^a)$) of the hydrogenated polymer block $HD^a$ of the conjugated diene polymer in the hydrogenated block copolymer A is preferably 10,000 to 300,000, more preferably 15,000 to 300,000, still more preferably 15,000 to 150,000, further still more preferably 20,000 to 80,000, particularly preferably 25,000 to 50,000. Control of the weight average molecular weight ($Mw(HD^a)$) of the hydrogenated polymer block $HD^a$ within this range results in a hydrogenated block copolymer composition having smaller permanent elongation and a higher elastic modulus.

Although not particularly limited, the content of the aromatic vinyl monomer units in the total monomer units in the hydrogenated block copolymer A is preferably 10 to 35% by weight, more preferably 12 to 32% by weight, still more preferably 15 to 30% by weight.

Although not particularly limited, the weight average molecular weight of the entire hydrogenated block copolymer A is preferably 20,000 to 500,000, more preferably 25,000 to 300,000, still more preferably 30,000 to 150,000.

The hydrogenated block copolymer B in the hydrogenated block copolymer composition is a hydride of an aromatic vinyl-conjugated diene-aromatic vinyl block copolymer composed of the conjugated diene polymer block $HD^b$ and two aromatic vinyl polymer blocks, i.e., $Ar1^b$ and $Ar2^b$ bonded to two terminals of the conjugated diene polymer block $HD^b$, respectively.

The weight average molecular weights ($Mw(Ar1^b)$, $Mw(Ar2^b)$) of the two aromatic vinyl polymer blocks $Ar1^b$ and $Ar2^b$ in the hydrogenated block copolymer B are preferably 2,000 to 40,000, more preferably 2,500 to 30,000, still more preferably 3,000 to 10,000, particularly preferably 3,500 to 6,000. Control of $Mw(Ar1^b)$ and $Mw(Ar2^b)$ within this range results in a hydrogenated block copolymer composition having smaller permanent elongation. The weight average molecular weights ($Mw(Ar1^b)$, $Mw(Ar2^b)$) of the two aromatic vinyl polymer blocks $Ar1^b$ and $Ar2^b$ may be equal or may be different as long as the weight average molecular weights are within this range. Preferably, the weight average molecular weights are substantially equal. For example, the ratio ($Mw(Ar2^b)/Mw(Ar1^b)$) of the weight average molecular weight ($Mw(Ar2^b)$) of $Ar2^b$ to the weight average molecular weight ($Mw(Ar1^b)$) of $Ar1^b$ is in the range of 0.95 to 1.05.

More preferably, the weight average molecular weight (Mw(Ar1$^b$), Mw(Ar2$^b$)) of at least one of these two aromatic vinyl polymer blocks Ar1$^b$ and Ar2$^b$ is substantially equal to the weight average molecular weight (Mw(Ar1$^a$)) of the aromatic vinyl polymer block Ar1$^a$ having a relatively small weight average molecular weight, which is a constituent of the hydrogenated block copolymer A. For example, preferably, the ratio (Mw(Ar1$^b$)/Mw(Ar1$^a$)) of the weight average molecular weight (Mw(Ar1$^b$)) of Ar1$^b$ to the weight average molecular weight (Mw(Ar1$^a$)) of Ar1$^a$ is in the range of 0.95 to 1.05, or the ratio (Mw(Ar2$^b$)/Mw(Ar1$^a$)) of the weight average molecular weight (Mw(Ar2$^b$)) of Ar2$^b$ to the weight average molecular weight (Mw(Ar1$^a$)) of Ar1$^a$ is in the range of 0.95 to 1.05.

The vinyl bond content of the hydrogenated polymer block HD$^b$ of the conjugated diene polymer in the hydrogenated block copolymer B (the proportion of 1,2-vinyl bonds and 3,4-vinyl bonds in the total conjugated diene monomer units) is usually 1 to 80 mol %, preferably 1 to 50 mol %, more preferably 1 to 50 mol %, still more preferably 1 to 30 mol %, further still more preferably 1 to 20 mol %, particularly preferably 2 to 15 mol %, most preferably 3 to 10 mol %. Control of the vinyl bond content within this range results in a block copolymer composition having smaller permanent elongation. Preferably, the vinyl bond content of the hydrogenated polymer block HD$^b$ of the conjugated diene polymer in the hydrogenated block copolymer B is substantially equal to that of the hydrogenated polymer block HD$^a$ of the conjugated diene polymer in the hydrogenated block copolymer A.

If the hydrogenated block copolymer composition according to the present invention is produced by a production method using a coupling agent, such as a method for producing the hydrogenated block copolymer composition, comprising the steps (1a) to (6a) described later, the hydrogenated polymer block HD$^b$ of the conjugated diene polymer in the hydrogenated block copolymer B may contain a residue of the coupling agent. Specifically, the hydrogenated block copolymer B may be a compound represented by the following formula:

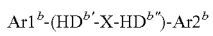

Ar1$^b$-(HD$^{b'}$-X-HD$^{b''}$)-Ar2$^b$

Namely, according to an embodiment, as shown in the above formula, the hydrogenated polymer block HD$^b$ of the conjugated diene polymer may be composed of HD$^{b'}$ and HD$^{b''}$ coupled via the residue X of the coupling agent. Examples of the residue X of the coupling agent include residues of bifunctional coupling agents exemplified in the method for producing the hydrogenated block copolymer composition, the method comprising the steps (1a) to (6a) described later.

The weight average molecular weight (Mw(HD$^b$)) of the hydrogenated polymer block HD$^b$ of the conjugated diene polymer in the hydrogenated block copolymer B is preferably 10,000 to 300,000, more preferably 15,000 to 300,000, still more preferably 15,000 to 150,000, further still more preferably 20,000 to 80,000, particularly preferably 25,000 to 50,000. Control of the weight average molecular weight (Mw(HD$^b$)) of the hydrogenated polymer block (HD$^b$) within this range results in a hydrogenated block copolymer composition having smaller permanent elongation and higher elastic modulus.

Although not particularly limited, the content of aromatic vinyl monomer units in the total monomer units in the hydrogenated block copolymer B is preferably 35 to 90% by weight, more preferably 40 to 87% by weight, still more preferably 43 to 85% by weight.

Although not particularly limited, the weight average molecular weight of the entire hydrogenated block copolymer B is preferably 20,000 to 200,000, more preferably 25,000 to 150,000, still more preferably 30,000 to 70,000.

Although not particularly limited, the hydrogenated block copolymer A and the hydrogenated block copolymer B constituting the hydrogenated block copolymer composition according to the present invention and the polymer blocks constituting these block copolymers each have a molecular weight distribution of preferably 1.1 or less, more preferably 1.05 or less, the molecular weight distribution being represented by the ratio [(Mw)/(Mn)] of the weight average molecular weight (Mw) to the number average molecular weight (Mn).

The weight ratio (A/B) between the hydrogenated block copolymer A and the hydrogenated block copolymer B contained in the hydrogenated block copolymer composition according to the present invention is preferably 10/90 to 80/20, more preferably 12/88 to 60/40, still more preferably 15/85 to 50/50. By controlling the contents of the hydrogenated block copolymer A and the hydrogenated block copolymer B in the ratio specified above, the resulting hydrogenated block copolymer composition can have a high elastic modulus and small permanent elongation. A significantly small weight ratio (A/B) results in a hydrogenated block copolymer composition having an insufficient elastic modulus, and a significantly large weight ratio (A/B) results in a hydrogenated block copolymer composition having large permanent elongation.

In the hydrogenated block copolymer composition according to the present invention, the hydrogenation ratio of olefins in the polymer components constituting the hydrogenated block copolymer composition is in the range of 10 to 100%. Here, the hydrogenation ratio of olefins indicates the hydrogenation ratio of olefins in the total polymer components constituting the hydrogenated block copolymer composition, and specifically is the proportion (mol %) of hydrogenated ones of the total non-aromatic carbon-carbon double bonds contained in the polymer components before hydrogenation. The present inventor, who has conducted extensive research, has found that while a high elastic modulus and small permanent elongation are maintained, high thermal stability can be ensured by preparing a hydrogenated block copolymer composition comprising the hydrogenated block copolymer A represented by General Formula (A) and the hydrogenated block copolymer B represented by General Formula (B) in a specific weight proportion while controlling the hydrogenation ratio of olefins in the hydrogenated block copolymer composition within the above range. In particular, according to the present invention, the hydrogenated block copolymer A represented by General Formula (A) and the hydrogenated block copolymer B represented by General Formula (B) are contained in a specific weight proportion. Thereby, while an increase in permanent elongation associated with hydrogenation is effectively suppressed, the thermal stability improving effect due to the hydrogenation can be ensured, thus resulting a hydrogenated block copolymer composition having a high elastic modulus, small permanent elongation, and high thermal stability.

The hydrogenation ratio of olefins in the polymer components constituting the hydrogenated block copolymer composition according to the present invention may be in the range of 10 to 100%, and is preferably 30 to 100%, more preferably 70 to 100%, still more preferably 90 to 100%. A significantly low hydrogenation ratio of olefins results in insufficient thermal stability of the hydrogenated block copolymer composition.

Although it is sufficient that the hydrogenation ratio of olefins is in the above range in the hydrogenated block copolymer composition according to the present invention, each of the polymer components constituting the hydrogenated block copolymer composition has an iodine value within the range of preferably 0 to 300 $gI_2/100$ g, more preferably 0 to 150 $gI_2/100$ g, still more preferably 0 to 125 $gI_2/100$ g, further still more preferably 0 to 90 $gI_2/100$ g, particularly preferably 0 to 30 $gI_2/100$ g. A significantly large iodine value is associated with low thermal stability.

Although the hydrogenated block copolymer composition according to the present invention may contain only the hydrogenated block copolymer A and the hydrogenated block copolymer B as the polymer components, the hydrogenated block copolymer composition according to the present invention may contain a polymer component other than the hydrogenated block copolymer A and the hydrogenated block copolymer B in the range not impairing the advantageous effects of the present invention.

Examples of the polymer component other than the hydrogenated block copolymer A and the hydrogenated block copolymer B which can be contained in the hydrogenated block copolymer composition according to the present invention include aromatic vinyl-conjugated diene-aromatic vinyl block copolymers other than the hydrogenated block copolymer A and the hydrogenated block copolymer B, aromatic vinyl-conjugated diene block copolymers, aromatic vinyl homopolymers, conjugated diene homopolymers, aromatic vinyl-conjugated diene random copolymers, and branched polymers thereof; thermoplastic elastomers such as polyurethane thermoplastic elastomers, polyamide thermoplastic elastomers, and polyester thermoplastic elastomers; thermoplastic resins such as polyethylene, polypropylene, polyvinyl chloride, acrylonitrile-styrene copolymers, acrylonitrile-butadiene-styrene copolymers, and polyphenylene ether; and the like.

In the hydrogenated block copolymer composition according to the present invention, the content of the polymer component other than the hydrogenated block copolymer A and the hydrogenated block copolymer B is preferably 20% by weight or less, more preferably 10% by weight or less relative to the total polymer components.

In the hydrogenated block copolymer composition according to the present invention, the proportion of the aromatic vinyl monomer units in the total polymer components in the hydrogenated block copolymer composition (the total monomer units constituting the polymer components) (hereinafter, referred to as "the content of the total aromatic vinyl monomer units" in some cases) is preferably 25 to 70% by weight, more preferably 30 to 60% by weight, still more preferably 32 to 50% by weight. Control of the content of the total aromatic vinyl monomer units within the above range results in a hydrogenated block copolymer composition having smaller permanent elongation and a higher elastic modulus. The content of the total aromatic vinyl monomer units can be easily adjusted by adjusting the amounts the hydrogenated block copolymer A, the hydrogenated block copolymer B, and the polymer component other than these which constitute the hydrogenated block copolymer composition in consideration of the contents of aromatic vinyl monomer units therein.

If all the polymer components constituting the hydrogenated block copolymer composition are composed of only aromatic vinyl monomer units and conjugated diene monomer units, only the aromatic vinyl monomer units can be extracted according to the method described in Rubber Chem. Technol., 45, 1295 (1972) by subjecting the polymer components in the hydrogenated block copolymer composition to ozone decomposition, followed by reduction with lithium aluminum hydride to decompose the conjugated diene monomer units (including the hydrogenated ones). Thus, the content of the total aromatic vinyl monomer units can be readily measured.

Although not particularly limited, the weight average molecular weight of the total polymer components constituting the hydrogenated block copolymer composition according to the present invention is preferably 30,000 to 400,000, more preferably 35,000 to 100,000, still more preferably 40,000 to 80,000.

Although not particularly limited, the molecular weight distribution represented by the ratio (Mw/Mn) of the weight average molecular weight (Mw) to the number average molecular weight (Mn) of the total polymer components constituting the hydrogenated block copolymer composition according to the present invention is preferably 1.01 to 10, more preferably 1.02 to 5, still more preferably 1.03 to 3, further still more preferably 1.03 to 2, particularly preferably 1.02 to 1.5.

The hydrogenated block copolymer composition according to the present invention may contain components other than the polymer components as needed. Examples of the components other than the polymer components include an antioxidant, a softening agent, a tackifier, an antimicrobial agent, a photostabilizer, an ultraviolet absorbing agent, a dye, a lubricant, a cross-linking agent, a cross-linking accelerator, and the like.

Examples of the antioxidant include hindered phenol compounds such as pentaerythritol tetrakis[3-(3,5-di-t-butyl-4-hydroxyphenyl)propionate], 2,6-di-t-butyl-p-cresol, and di-t-butyl-4-methylphenol; thiodicarboxylate esters such as dilauryl thiopropionate; phosphorous acid salts such as tris(nonylphenyl) phosphite; and the like. These antioxidants may be used alone or in combination. Although not particularly limited, the content of the antioxidant is preferably 10 parts by weight or less, more preferably 0.5 to 5 parts by weight relative to 100 parts by weight of the hydrogenated block copolymer composition.

The hydrogenated block copolymer composition according to the present invention can be produced by any method; for example, the hydrogenated block copolymer composition can be produced according to a traditional method for producing a block copolymer and a traditional hydrogenation method by separately preparing the hydrogenated block copolymer A and the hydrogenated block copolymer B, optionally compounding an additional polymer component and a variety of additives, and mixing these by a normal method such as kneading or solution mixing. On the other hand, in the present invention, the method for producing the hydrogenated block copolymer composition according to the present invention described below is suitable because the hydrogenated block copolymer composition can be produced with high productivity.

In other words, the method for producing the hydrogenated block copolymer composition according to the present invention comprises steps (1) to (7):

(1): preparing a solution containing a terminally active aromatic vinyl polymer by polymerizing an aromatic vinyl monomer in a solvent in the presence of a polymerization initiator;

(2): preparing a solution containing a terminally active aromatic vinyl-conjugated diene block copolymer by adding a conjugated diene monomer to the solution containing a terminally active aromatic vinyl polymer prepared in (1), and polymerizing the conjugated diene monomer;

(3): preparing a solution containing a terminally active aromatic vinyl-conjugated diene-aromatic vinyl block copolymer by adding an aromatic vinyl monomer to the solution containing a terminally active aromatic vinyl-conjugated diene block copolymer prepared in (2), and polymerizing the aromatic vinyl monomer;

(4): preparing a solution containing a block copolymer B' by adding a polymerization terminator to the solution containing a terminally active aromatic vinyl-conjugated diene-aromatic vinyl block copolymer, which is prepared in (3), in an amount of less than 1 molar equivalent relative to the active terminal of the terminally active aromatic vinyl-conjugated diene-aromatic vinyl block copolymer to inactivate a portion of the active terminal;

(5): preparing a solution containing the block copolymer B' and a block copolymer A' by adding an aromatic vinyl monomer to the solution containing a block copolymer B' prepared in (4), and polymerizing the aromatic vinyl monomer;

(6): preparing a solution containing a hydrogenated block copolymer B and a hydrogenated block copolymer A by hydrogenating the solution containing the block copolymer B' and a block copolymer A' prepared in (5); and (7): recovering a hydrogenated block copolymer composition from the solution containing a hydrogenated block copolymer B and a hydrogenated block copolymer A prepared in (6).

<Step (1)>

In the method for producing the hydrogenated block copolymer composition according to the present invention, first, in the step (1), a solution containing a terminally active aromatic vinyl polymer is prepared by polymerizing an aromatic vinyl monomer in a solvent in the presence of a polymerization initiator.

As the polymerization initiator, a polymerization initiator known to have anionic polymerization activity to aromatic vinyl monomers and conjugated diene monomers can be used. Examples of the polymerization initiator include organic alkali metal compounds, organic alkaline earth metal compounds, organic lanthanoid rare earth metal compounds, and the like.

For the organic alkali metal compounds, particularly suitably used are organic lithium compounds having one or more lithium atoms in the molecule. Specific examples of the organic alkali metal compounds include organic monolithium compounds such as ethyllithium, n-propyllithium, isopropyllithium, n-butyllithium, sec-butyllithium, t-butyllithium, hexyllithium, phenyllithium, stilbenelithium, dialkylaminolithium compounds, diphenylaminolithium, and ditrimethylsilylaminolithium; organic dilithium compounds such as methylenedilithium, tetramethylenedilithium, hexamethylenedilithium, isoprenyldilithium, and 1,4-dilithioethylcyclohexane; organic trilithium compounds such as 1,3,5-trilithiobenzene; and the like. Among these, organic monolithium compounds are particularly suitably used.

Examples of the organic alkaline earth metal compounds include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate, ethylbarium, and the like.

Besides, those which form a homogeneous system in an organic solvent to have living polymerizability can also be used, for example, composite catalysts composed of lanthanoid rare earth metal compounds (including neodymium, samarium, gadolinium, and the like)/alkylaluminum/alkylaluminum halide/alkylaluminum hydride, or metallocene catalysts containing titanium, vanadium, samarium, gadolinium, or the like.

These polymerization initiators may be used alone or in combination as a mixture. The amount of the polymerization initiator to be used may be determined according to the target molecular weight of each block copolymer and is not particularly limited. The amount thereof is preferably 0.01 to 20 mmol, more preferably 0.05 to 15 mmol, still more preferably 0.1 to 10 mmol per 100 g of the total monomers to be used in polymerization.

The solvent used in polymerization can be any solvent inactive to the polymerization initiator and is not particularly limited. Examples thereof include linear hydrocarbon solvents, cyclic hydrocarbon solvents, a mixed solvent thereof, and the like. Examples of the linear hydrocarbon solvents include $C_4$ to $C_6$ linear alkanes and alkenes such as n-butane, isobutane, 1-butene, isobutylene, trans-2-butene, cis-2-butene, 1-pentene, trans-2-pentene, cis-2-pentene, n-pentane, isopentane, neo-pentane, and n-hexane; and the like. Examples of the cyclic hydrocarbon solvents include aromatic compounds such as benzene, toluene, and xylene; alicyclic hydrocarbon compounds such as cyclopentane and cyclohexane; and the like. These solvents may be used alone or in combination as a mixture.

Although not particularly limited, the amount of the solvent to be used is set such that the content of the total block copolymers in the solution after the polymerization reaction is preferably 5 to 60% by weight, more preferably 10 to 55% by weight, still more preferably 20 to 50% by weight.

During production of the hydrogenated block copolymer composition, a Lewis base compound may be added to the reaction system to control the structures of the polymer blocks in each of the block copolymers. Examples of the Lewis base compound include ethers such as tetrahydrofuran, diethyl ether, dioxane, dibutyl ether, ethylene glycol dimethyl ether, ethylene glycol dibutyl ether, diethylene glycol dimethyl ether, and diethylene glycol dibutyl ether; tertiary amines such as tetramethylethylenediamine, trimethylamine, triethylamine, pyridine, and quinuclidine; alkali metal alkoxides such as potassium t-amyloxide and potassium t-butyloxide; phosphines such as triphenylphosphine; and the like. These Lewis base compounds may be used alone or in combination as a mixture.

During the production of the hydrogenated block copolymer composition, the Lewis base compound can be added at any timing, which may be appropriately determined according to the structures of the block copolymers. For example, the Lewis base compound may be preliminarily added before polymerization is started, or may be added after the polymer blocks are partially polymerized. Furthermore, the Lewis base compound may be preliminarily added before polymerization is started, and may be further added after the polymer blocks are partially polymerized.

The polymerization reaction temperature is preferably 10 to 150° C., more preferably 30 to 130° C., still more preferably 40 to 90° C., and the polymerization time is preferably 48 hours or less, more preferably 0.5 to 10 hours. The polymerization pressure is not particularly limited as long as it is controlled within the range of a pressure enough to maintain the monomers and the solvent in a liquid phase at a polymerization temperature.

The solution containing a terminally active aromatic vinyl polymer can be prepared by polymerizing the aromatic vinyl monomer in the solvent in the presence of the polymerization initiator under such conditions. Thus, the terminally active aromatic vinyl polymer prepared in the step (1) constitutes the aromatic vinyl polymer block $Ar1^a$ having a relatively small weight average molecular weight for the hydrogenated block copolymer A and any one of the aromatic vinyl polymer blocks $Ar1^b$ and $Ar2^b$ (i.e., $Ar1^b$ or $Ar2^b$) for the hydrogenated block copolymer B, the hydrogenated block copolymer A and the hydrogenated block copolymer B constituting the hydrogenated block copolymer composition. For this reason, the polymerization conditions in the step (1) including the amount of the aromatic vinyl monomer may be determined according to the target weight average molecular weights of these polymer blocks.
<Step (2)>

Then, in the step (2), a solution containing a terminally active aromatic vinyl-conjugated diene block copolymer is prepared by adding a conjugated diene monomer to the solution containing a terminally active aromatic vinyl polymer prepared in the step (1), and polymerizing the conjugated diene monomer.

In the step (2), as a result of addition of the conjugated diene monomer to the solution containing a terminally active aromatic vinyl polymer prepared in the step (1), a conjugated diene polymer chain is formed from the active terminal, thereby preparing the solution containing a terminally active aromatic vinyl-conjugated diene block copolymer.

The conjugated diene polymer chain formed in the step (2) (conjugated diene block in the terminally active aromatic vinyl-conjugated diene block copolymer prepared in the step (2)) will form the hydrogenated polymer block $HD^a$ of the conjugated diene polymer in the hydrogenated block copolymer A and the hydrogenated polymer block $HD^b$ of the conjugated diene polymer in the hydrogenated block copolymer B. For this reason, the polymerization conditions in the step (2) including the amount of the conjugated diene monomer may be determined according to the target weight average molecular weights of these polymer blocks or the vinyl bond contents therein (for example, the polymerization conditions may be determined in the ranges described in the step (1)).
<Step (3)>

Then, in the step (3), a solution containing a terminally active aromatic vinyl-conjugated diene-aromatic vinyl block copolymer is prepared by adding an aromatic vinyl monomer to the solution containing a terminally active aromatic vinyl-conjugated diene block copolymer prepared in the step (2), and polymerizing the aromatic vinyl monomer.

In the step (3), as a result of addition of the aromatic vinyl monomer to the solution containing a terminally active aromatic vinyl-conjugated diene block copolymer prepared in the step (2), an aromatic vinyl polymer chain is formed from the active terminal, thereby preparing the solution containing a terminally active aromatic vinyl-conjugated diene-aromatic vinyl block copolymer.

The aromatic vinyl polymer chain formed in the step (3) (aromatic vinyl block in the terminally active aromatic vinyl-conjugated diene-aromatic vinyl block copolymer prepared in the step (3)) will form one of the aromatic vinyl polymer blocks $Ar1^b$ and $Ar2^b$ for the hydrogenated block copolymer B (i.e., $Ar1^b$ or $Ar2^b$ which is a block different from that formed in the step (1), for example, if the polymer chain forms $Ar1^b$ in the step (1), $Ar2^b$ is the corresponding block). For this reason, the polymerization conditions in the step (3) including the amount of the aromatic vinyl monomer may be determined according to the target weight average molecular weight of such a polymer block (for example, the polymerization conditions may be determined in the ranges described in the step (1)).
<Step (4)>

Then, in the step (4), a solution containing a block copolymer B' is prepared by adding a polymerization terminator to the solution containing a terminally active aromatic vinyl-conjugated diene-aromatic vinyl block copolymer, which is prepared in the step (3), in an amount of less than 1 molar equivalent relative to the active terminal of the terminally active aromatic vinyl-conjugated diene-aromatic vinyl block copolymer to inactivate a portion of the active terminal.

The block copolymer B' prepared in the step (4) is a block copolymer before hydrogenation for preparing the hydrogenated block copolymer B.

The polymerization terminator can be any compound which can react with the active terminal to inactivate the active terminal and to be no longer reactive with other active terminals after having reacted with one active terminal, and preferred polymerization terminators are preferably compounds not containing a halogen atom. Among these, particularly preferred are those which generate a metal alkoxide, a metal aryloxide, or a metal hydroxide when reacting with the active terminals. Specific examples of the polymerization terminator include water; monohydric alcohols such as methanol and ethanol; monohydric phenols such as phenol and cresol; and the like.

The amount of the polymerization terminator to be used may be determined according to the proportions of the hydrogenated block copolymer A and the hydrogenated block copolymer B constituting the hydrogenated block copolymer composition, and is not particularly limited as long as it is less than 1 molar equivalent relative to the active terminal of the polymer. The amount of the polymerization terminator to be used is in the range of preferably 0.18 to 0.91 molar equivalent, more preferably 0.35 to 0.80 molar equivalent relative to the active terminal of the polymer.

Thus, in the step (4), as a result of addition of the polymerization terminator to the solution containing a terminally active aromatic vinyl-conjugated diene-aromatic vinyl block copolymer in an amount of less than 1 molar equivalent relative to the active terminal thereof, a portion of the active terminal of the terminally active aromatic vinyl-conjugated diene-aromatic vinyl block copolymer is inactivated, and thus, the copolymer having the inactivated active terminal corresponds to the block copolymer B' before hydrogenation for forming the hydrogenated block copolymer B. The residual terminally active aromatic vinyl-conjugated diene-aromatic vinyl block copolymer without reacting with the polymerization terminator is left unreacted in the solution while it maintains the active terminal.
<Step (5)>

Then, in the step (5), a solution containing the block copolymer B' and a block copolymer A' is prepared by adding an aromatic vinyl monomer to the solution containing a block copolymer B' prepared in the step (4) and polymerizing the aromatic vinyl monomer.

In the step (5), after the aromatic vinyl monomer is added to the solution prepared in the step (4), the aromatic vinyl monomer is further polymerized to extend the aromatic vinyl polymer chain having the active terminal in the residual terminally active aromatic vinyl-conjugated diene-aromatic vinyl block copolymer without reacting with the polymerization terminator. Thereby, the block copolymer A' is prepared. The block copolymer A' is an aromatic vinyl-conjugated diene-aromatic vinyl block copolymer prepared through extension of the aromatic vinyl polymer chain, and will form a block copolymer before hydrogenation for preparing the hydrogenated block copolymer A.

At this time, the aromatic vinyl polymer chain extended in the step (5) will form the aromatic vinyl polymer block $Ar2^a$ having a relatively large weight average molecular weight in the hydrogenated block copolymer A in the hydrogenated block copolymer composition. For this reason, the polymerization conditions in the step (5) including the amount of the aromatic vinyl monomer may be determined according to the target weight average molecular weight of such an aromatic vinyl polymer block $Ar2^a$ (for example, the polymerization conditions may be determined in the ranges described in the step (1)).

<Step (6)>

Then, in the step (6), a solution containing a hydrogenated block copolymer B and a hydrogenated block copolymer A is prepared by hydrogenating the solution containing the block copolymer B' and a block copolymer A' prepared in the step (5).

The solution containing the block copolymer B' and a block copolymer A' can be hydrogenated by any method. Examples thereof include a method of bringing the solution containing the block copolymer B' and a block copolymer A' into contact with hydrogen in the presence of a hydrogenation catalyst, and the like.

Examples of the hydrogenation catalyst include, but should not be limited to, Ziegler catalysts such as heterogeneous supported catalysts composed of a metal such as Ni, Pt, Pd, or Ru supported on a carrier such as carbon, silica, alumina, or diatomite in combination with reducing agents such as an organic or acetylacetone salt of Ni, Co, Fe, or Cr and organic Al; organic complex catalysts such as organic metal compounds of Ru, Rh, and the like; homogeneous catalysts such as a titanocene compound in combination with organic Li, organic Al, or organic Mg as a reducing agent; and the like. Among these, Ziegler catalysts are preferred.

Hydrogenation can be performed according to the methods disclosed in JP S42-8704 B, JP S43-6636 B, JP S59-133203 A, JP S60-220147 A, and the like.

Although the conditions for the hydrogenation may be selected according to the hydrogenation ratio of olefins in the polymer components constituting the hydrogenated block copolymer composition, the hydrogenation temperature is preferably 0 to 200° C., more preferably 30 to 150° C. The pressure of hydrogen used in the hydrogenation is preferably 0.1 to 15 MPa, more preferably 0.2 to 10 MPa, still more preferably 0.3 to 5 MPa, and the hydrogenation time is preferably 3 minutes to 10 hours, more preferably 10 minutes to 5 hours. The hydrogenation may be a batch process, a continuous process, or a combination thereof.

<Step (7)>

Then, in the step (7), the target hydrogenated block copolymer composition is recovered from the solution containing a hydrogenated block copolymer B and a hydrogenated block copolymer A prepared in the step (6).

The recovery may be performed according to a normal method, and the method for recovery is not particularly limited. For example, after the reaction is completed, a polymerization terminator is optionally added to inactivate the active terminal of the terminally active polymer, and further, additives such as an antioxidant are optionally added; thereafter, the solution is treated by a known solvent method such as direct drying or steam stripping. Thereby, the target hydrogenated block copolymer composition can be recovered. In this step, the polymerization terminator described above can be used.

If the hydrogenated block copolymer composition is recovered as a slurry by steam stripping or the like, preferably, the slurry is dehydrated using any dehydrating machine such as an extruder squeezer, and the hydrogenated block copolymer composition in the form of crumbs is recovered. Preferably, the recovered crumbs are dried using any dryer such as a band dryer or an expansion extrusion dryer. The hydrogenated block copolymer composition prepared as above may be processed into pellets or the like according to a normal method before use.

It is preferred that the hydrogenated block copolymer composition in the form of solids (pellets, crumbs, or the like) be used after the water content in the hydrogenated block copolymer composition in the form of solids is reduced using a dryer such as a hopper dryer, a hot air circulating shelf-type dryer, a shelf-type vacuum dryer, or a stirring vacuum dryer. The drying conditions at this time are not particularly limited as long as the target water content can be reached, and may be set according to the water content to be reduced and the type of the dryer. Usually, the drying temperature is set in the range of 40 to 90° C. and the drying time is set in the range of 1 to 24 hours.

The method for producing the hydrogenated block copolymer composition according to the present invention can provide a target hydrogenated block copolymer composition having productivity higher than that in the case where hydrogenated block copolymers are separately prepared and mixed, because the hydrogenated block copolymer A and the hydrogenated block copolymer B can be continuously prepared in the same reaction vessel.

Because the hydrogenated block copolymer composition according to the present invention has a high elastic modulus, small permanent elongation, and high thermal stability, utilizing such properties, the hydrogenated block copolymer composition according to the present invention can be suitably used in a variety of applications. For example, the hydrogenated block copolymer composition according to the present invention can be suitably used in applications to materials for forming stretch films, gloves, elastic bands, condoms, OA apparatuses, a variety of rolls for office equipment, antivibration sheets for electric and electronic devices, antivibration rubbers, impact absorption sheets, impact buffer films and sheets, vibration suppression sheets for housing, vibration suppression damper materials, and the like; applications to tackifiers used in adhesive tapes, pressure-sensitive adhesive sheets, adhesive labels, adhesive layers for surface protective films, dust rollers, and the like; applications to adhesives used in sanitary goods, bookbinding, and the like; and applications to elastic fibers used in cloths, sport gear, and the like.

If the hydrogenated block copolymer composition according to the present invention is formed into a film such as a stretch film, any traditionally known forming method such as melt forming or solution forming can be used as a film forming method without limitation. From the viewpoint of productivity, melt forming is particularly suitable.

If the hydrogenated block copolymer composition according to the present invention is formed into a film by melt forming, a variety of melt forming methods can be used. To produce a smooth film with particularly high productivity, extrusion molding (melt extrusion molding) methods are suitable, and extrusion molding methods using a T-die are particularly suitable. Specific examples of the extrusion molding methods using a T-die include a method of extruding the hydrogenated block copolymer composition heated at a temperature of 150 to 250° C. from a T-die attached to a single screw extruder or a twin screw extruder, and winding the extruded product with a winding roll under cooling. The film may be stretched when cooled with the winding roll. The film to be wound may be formed by applying a melted product of the hydrogenated block copolymer composition onto a base made of polyethylene terephthalate, polyethylene, polypropylene, a non-woven fabric, or a releasing paper, or may be formed by sandwiching a melted product of the hydrogenated block copolymer composition with such bases.

The resulting film may be used in a combined form with the base (s), or may be used after peeled from the base (s). The thickness of the film is adjusted depending on its application. For example, for a film for sanitary goods such as disposable diapers and feminine hygiene products, the thickness is preferably 0.01 to 5 mm, more preferably 0.03 to 1 mm, still more preferably 0.05 to 0.5 mm.

In production of the hydrogenated block copolymer composition according to the present invention, the above-described production method (the production method comprising (1) to (7)) may be replaced by a method for producing the hydrogenated block copolymer composition, the method comprising (1a) to (6a):

(1a): preparing a solution containing a terminally active aromatic vinyl polymer by polymerizing an aromatic vinyl monomer in a solvent in the presence of a polymerization initiator;

(2a): preparing a solution containing a terminally active aromatic vinyl-conjugated diene block copolymer by adding a conjugated diene monomer to the solution containing a terminally active aromatic vinyl polymer prepared in (1a), and polymerizing the conjugated diene monomer;

(3a): preparing a solution containing a block copolymer B' by adding a bifunctional coupling agent to the solution containing a terminally active aromatic vinyl-conjugated diene block copolymer, which is prepared in (2a), in an amount such that the total amount of the functional groups is less than 1 molar equivalent relative to the active terminal thereof, to couple a portion of the terminally active aromatic vinyl-conjugated diene block copolymer;

(4a): preparing a solution containing the block copolymer B' and a block copolymer A' by adding an aromatic vinyl monomer to the solution containing a block copolymer B' prepared in (3a), and polymerizing the aromatic vinyl monomer;

(5a): preparing a solution containing a hydrogenated block copolymer B and a hydrogenated block copolymer A by hydrogenating the solution containing the block copolymer B' and a block copolymer A' prepared in (4a); and (6a): recovering a hydrogenated block copolymer composition from the solution containing a hydrogenated block copolymer B and a hydrogenated block copolymer A prepared in (5a).

<Steps (1a) and (2a)>

The steps (1a) and (2a) are the same as the steps (1) and (2), and the same conditions can be used.

<Step (3a)>

In the step (3a), a solution containing a block copolymer B' is prepared by adding a bifunctional coupling agent to the solution containing a terminally active aromatic vinyl-conjugated diene block copolymer, which is prepared in the step (2a), in an amount such that the total amount of the functional groups is less than 1 molar equivalent relative to the active terminal thereof, to couple a portion of the terminally active aromatic vinyl-conjugated diene block copolymer.

The block copolymer B' prepared in the step (3a) will form a block copolymer before hydrogenation for forming the hydrogenated block copolymer B.

The bifunctional coupling agent may be any compound having two functional groups reactive with the active terminal, and examples thereof include, but should not be limited to, bifunctional halogenated silanes such as dichlorosilane, monomethyldichlorosilane, and dimethyldichlorosilane; bifunctional halogenated alkanes such as dichloroethanes, dibromoethane, methylene chloride, and dibromomethane; bifunctional halogenated tin compounds such as dichlorotin, monomethyldichlorotin, dimethyldichlorotin, monoethyldichlorotin, diethyldichlorotin, monobutyldichlorotin, and dibutyldichlorotin; and the like.

The amount of the bifunctional coupling agent to be used may be determined according to the proportions of the hydrogenated block copolymer A and the hydrogenated block copolymer B constituting the hydrogenated block copolymer composition.

Thus, in the step (3a), as a result of addition of the bifunctional coupling agent to the solution containing a terminally active aromatic vinyl-conjugated diene block copolymer in an amount such that the total amount of the functional groups is less than 1 molar equivalent relative to the active terminal thereof, a portion of the terminally active aromatic vinyl-conjugated diene block copolymer is coupled to form a block copolymer B' before hydrogenation for forming the hydrogenated block copolymer B. The residual terminally active aromatic vinyl-conjugated diene block copolymer without reacting with the bifunctional coupling agent is left unreacted in the solution while it maintains the active terminals.

<Step (4a)>

Then, in the step (4a), a solution containing the block copolymer B' and a block copolymer A' is prepared by adding an aromatic vinyl monomer to the solution containing a block copolymer B' prepared in the step (3a), and polymerizing the aromatic vinyl monomer.

In the step (4a), as a result of addition of the aromatic vinyl monomer to the solution prepared in the step (3a), the aromatic vinyl monomer is polymerized to extend the aromatic vinyl polymer chain having the active terminal in the residual terminally active aromatic vinyl-conjugated diene block copolymer without reacting with the bifunctional coupling agent. Thereby, a block copolymer A' is prepared. The block copolymer A' will form a block copolymer before hydrogenation for forming the hydrogenated block copolymer A.

At this time, the aromatic vinyl polymer chain formed in the step (4a) will form the aromatic vinyl polymer block $Ar2^a$ having a relatively large weight average molecular weight in the hydrogenated block copolymer A in the hydrogenated block copolymer composition. For this reason, the polymerization conditions in the step (4a) including the amount of the aromatic vinyl monomer may be determined according to the target weight average molecular weight of the aromatic vinyl polymer block $Ar2^a$, or the like (for example, the polymerization conditions may be determined in the ranges described in the step (1)).

<Steps (5a) and (6a)>

Then, the hydrogenated block copolymer composition according to the present invention can be prepared through the operations in the steps (5a) and (6a) from the solution containing a block copolymer B' and a block copolymer A', which is prepared in the step (4a). The steps (5a) and (6a) are the same as the steps (6) and (7), and the same conditions can be used.

EXAMPLES

Hereinafter, the present invention will be more specifically described by way of Examples and Comparative Examples, but the present invention will not be limited only to these Examples. To be noted, "parts" and "%" are mass-based unless otherwise specified.

The following test methods were performed in Examples and Comparative Examples.

[Weight Average Molecular Weight]

The weight average molecular weights were determined as molecular weights against polystyrene standards by high performance liquid chromatography where tetrahydrofuran at a flow rate of 0.35 ml/min was used as a carrier. The measurement was performed using an apparatus HLC8320 available from Tosoh Corporation, three columns (Shodex (registered trademark) KF-404HQ available from Showa Denko K.K.) connected in series (column temperature: 40° C.), and a differential refractometer and an ultraviolet detector as detectors. The molecular weights were calibrated against 12 points of polystyrene standards (500 to 3000000) available from Polymer Laboratories Ltd.

[Weight Ratio of Block Copolymers in (Hydrogenated) Block Copolymer Composition]

The weight ratio of the block copolymers was determined from the ratio of the areas of the peaks corresponding to the block copolymers in a chart obtained by high performance liquid chromatography.

[Weight Average Molecular Weights of Styrene Polymer Blocks in (Hydrogenated) Block Copolymer]

According to the method described in Rubber Chem. Technol., 45, 1295 (1972), the isoprene polymer block of each of the (hydrogenated) block copolymers was decomposed by reacting the (hydrogenated) block copolymers with ozone, followed by reduction with lithium aluminum hydride.

Specifically, the following procedure was performed. Namely, 300 mg of a sample was dissolved in a reaction vessel containing 100 ml of dichloromethane treated with a molecular sieve. This reaction vessel was placed into a cooling tank, and was cooled to −25° C. Thereafter, while oxygen was flowing into the reaction vessel at a flow rate of 170 mi/min, ozone generated by an ozone generator was introduced. After 30 minutes had passed from the start of the reaction, it was confirmed that the reaction had completed by introducing the gas flowing out of the reaction vessel into a potassium iodide aqueous solution. In the next step, 50 ml of diethyl ether and 470 mg of lithium aluminum hydride were placed into another reaction vessel purged with nitrogen. While the reaction vessel was being cooled with iced water, the solution reacted with ozone was slowly added dropwise to the reaction vessel. Thereafter, the reaction vessel was placed into a water bath, and was gradually heated, and the solution was refluxed at 40° C. for 30 minutes. Subsequently, while the solution was being stirred, diluted hydrochloric acid was added dropwise to the reaction vessel in small portions. The addition was continued until generation of hydrogen was hardly observed. After this reaction, a solid product formed in the solution was separated through filtration. The solid product was extracted with 100 ml of diethyl ether for 10 minutes. The extract and the filtrate obtained from the filtration were combined, and the solvent was distilled off to yield a solid sample. The resulting sample as above was measured for the weight average molecular weights according to the above-described weight average molecular weight measuring method, and the values were defined as the weight average molecular weights of the styrene polymer blocks.

[Weight Average Molecular Weight of (Hydrogenated) Isoprene Polymer Block in Each of (Hydrogenated) Block Copolymers]

For each of the (hydrogenated) block copolymers, the weight average molecular weight of the styrene polymer block was subtracted from the weight average molecular weight of the corresponding block copolymer, and the weight average molecular weight of the (hydrogenated) isoprene polymer block was determined based on the calculated value.

[Content of Styrene Units in (Hydrogenated) Block Copolymer]

The content of styrene units was determined based on the ratio of intensities detected by the differential refractometer and the ultraviolet detector in the measurement by high performance liquid chromatography. To be noted, copolymers having different contents of styrene units were preliminarily prepared, and were used to create a calibration curve.

[Content of Styrene Units in Entire (Hydrogenated) Block Copolymer Composition]

The content of styrene units was determined based on proton NMR measurement.

[Vinyl Bond Content in (Hydrogenated) Isoprene Polymer Block]

The vinyl bond content in each of the (hydrogenated) isoprene polymer blocks was determined based on proton NMR measurement.

[Hydrogenation Ratio (%) of Olefins in (Hydrogenated) Block Copolymer Composition]

For each of the block copolymer compositions before hydrogenation and the hydrogenated block copolymer compositions after hydrogenation, the olefin content was determined by $^1$H-NMR spectrum measurement. Based on the difference between the olefin contents before and after hydrogenation, the hydrogenation ratio (%) of olefins was calculated.

In the $^1$H-NMR spectrum measurement, deuterochloroform was used as a solvent, and an NMR analyzer JMN-AL series AL400 (available from JEOL, Ltd.) was used.

In Examples and Comparative Examples, the block copolymer compositions before hydrogenation and the hydrogenated block copolymers composition after hydrogenation both contained only isoprene units as olefin-derived monomer units. Thus, the hydrogenation ratio of isoprene was determined in the measurement, and was defined as the hydrogenation ratio of olefins.

[Iodine Value of (Hydrogenated) Block Copolymer Composition]

The iodine value of each of the (hydrogenated) block copolymer compositions was measured according to JIS K0070.

[Tensile Modulus of Film]

Two pieces of film having a width of 25 mm were cut out of a film of each of the (hydrogenated) block copolymer compositions to be measured, and were used as samples. The samples were measured while the stretch direction of the samples was aligned orthogonal to the melt flow during film formation. The measurement was performed according to the following procedure.

Namely, each sample was fixed to a Tensilon universal tester (available from ORIENTEC, Co., Ltd., "RTC-1210") under no tension with a distance between chucks of 40 mm. The sample was stretched to 200% at a rate of 300 mm/min, and then was returned to the initial distance between chucks at a rate of 300 mm/min. Furthermore, the sample was again stretched to 200% at the same rate, and was again returned to the initial distance between chucks at the same rate. The tensile stress at 50% elongation in the course where the sample was returned to the initial distance between chucks for the second time was measured, and the tensile modulus of the stretch film at 50% elongation was determined. A higher tensile modulus indicates a higher elastic modulus.

[Permanent Elongation of Film]

Using the Tensilon universal tester above, the permanent elongation of a film of each of the (hydrogenated) block copolymer compositions as a sample was measured according to ASTM 412 while the stretch direction of the sample was aligned orthogonal to the melt flow during film formation.

Specifically, the shape of the sample used was that of Die A, and the film was stretched at an elongation percentage of 100% where the gauge length before the stretch was 40 mm. Thereafter, the sample was kept as it was for 10 minutes, was rapidly shrunk without rebounding, and was left to stand for 10 minutes. The gauge length was then measured, and the permanent elongation was determined based on the following expression:

$$\text{permanent elongation}(\%)=(L_1-L_0)/L_0\times 100$$

$L_0$: gauge length (mn) before stretch
$L_1$: gauge length (mm) after the sample was shrunk and left to stand for 10 minutes

[Thermal Stability]

A sample film of each of the (hydrogenated) block copolymer compositions was subjected to a thermal degradation test (170° C.×60 minutes; in the presence of air) to measure the melt viscosity before thermal degradation test and that after thermal degradation test, and the viscosity retention was determined from the following expression. A higher viscosity retention is determined as higher thermal stability.

$$\text{viscosity retention}(\%)=(\text{melt viscosity after thermal degradation test/melt viscosity before thermal degradation test})\times 100$$

The melt viscosity was measured using a Flowtester CFT-500C (available from SHIMADZU Corporation) at a temperature of 180° C. under a load of 100 kgf/cm$^2$ with a die having a shape of 1 mm$\phi$×10 mm.

Example 1

(1) Preparation of Block Copolymer Composition Before Hydrogenation 56.6 kg of cyclohexane, 505 mmol of dibutyl ether, and 1.22 kg of styrene were added to a pressure-resistant reactor. While the system was being stirred at 40° C., 270.6 mmol of n-butyllithium (1.6 M solution) was added. After the addition was completed, the system was heated to 50° C. and polymerized for 1 hour (first stage of polymerization). The polymerization conversion ratio of styrene at this time was 100% by weight.

Subsequently, while the temperature was being controlled to keep 50 to 60° C., 6.49 kg of isoprene was continuously added to the reactor over 1 hour. The addition of isoprene was completed, followed by a polymerization reaction for another one hour (second stage of polymerization). The polymerization conversion ratio of isoprene at this time was 100%.

In the next step, while the temperature was being controlled to keep 50 to 60° C., 1.22 kg of styrene was continuously added over 1 hour. The addition of styrene was completed, followed by polymerization for another one hour to prepare a solution containing a terminally active styrene-isoprene-styrene triblock copolymer (third stage of polymerization). The polymerization conversion ratio of styrene at this time was 100%.

In the next step, 195 mmol of methanol as a polymerization terminator was added and mixed to inactivate a portion of the active terminal of the terminally active styrene-isoprene-styrene triblock copolymer, thereby preparing a solution containing a styrene-isoprene-styrene triblock copolymer which corresponds to a block copolymer B' for preparing a hydrogenated block copolymer B.

Thereafter, while the temperature was further successively being controlled to keep 50 to 60° C., 1.06 kg of styrene was continuously added over 1 hour. The addition of styrene was completed, followed by polymerization for another one hour to prepare a solution containing a terminally active styrene-isoprene-styrene triblock copolymer which corresponds to a block copolymer A' for preparing a hydrogenated block copolymer A (fourth stage of polymerization). The polymerization conversion ratio of styrene at this time was 100%.

Finally, the active terminal of the terminally active styrene-isoprene-styrene triblock copolymer was completely inactivated by adding and mixing 345 mmol of methanol as a polymerization terminator, to complete the polymerization reaction. Thereby, a solution containing a block copolymer composition before hydrogenation was prepared.

The amounts of the reaction agents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation was performed at a hydrogen pressure of 3 MPa and a reaction temperature of 80° C. for a reaction time of 3 hours after a Ni(AcAc)$_2$-TIBAL catalyst as a hydrogenating catalyst was added to the solution containing a block copolymer composition before hydrogenation in a proportion of 0.5% by weight relative to the block copolymer composition before hydrogenation.

A portion of the resulting solution containing a hydrogenated block copolymer composition was extracted to determine the weight average molecular weights of the block copolymers contained in the composition, the weight ratio of the block copolymers in the composition, the weight average molecular weights of the styrene polymer blocks in each of the block copolymers, the weight average molecular weight of the isoprene polymer block in each of the block copolymers, the content of styrene units in each of the block copolymers, the content of styrene units in the (entire) block copolymer composition, the vinyl bond content of the isoprene polymer block in each of the block copolymers, and the hydrogenation ratio of olefins. These values are summarized in Table 2.

(3) Recovery and Formation of Hydrogenated Block Copolymer Composition 0.3 parts of 2,6-di-t-butyl-p-cresol as an antioxidant was added to and mixed with 100 parts of the resulting solution of a hydrogenated block copolymer composition. The mixed solution was added dropwise in small portions to hot water heated to 85 to 95° C., and the solvent was volatilized. Thus, a precipitate was obtained. The precipitate was crushed, and was dried with hot air at 85° C. to recover a hydrogenated block copolymer composition in the form of crumbs.

In the next step, the resulting hydrogenated block copolymer composition in the form of crumbs was fed to a single screw extruder including an underwater hot cutter at the leading end of the extruder, and was formed into cylindrical pellets having an average diameter of about 5 mm and an average length of about 5 mm. The pellets of the hydrogenated block copolymer composition were placed into a hopper dryer heated to 60° C., and was dried for 10 hours while dry air at 60° C. was flowing.

In the next step, using a twin screw extruder provided with a T-die, the dried pellets of the hydrogenated block copolymer composition obtained as above were melted under heating at 200° C., and were extruded to be formed into a film having a thickness of 0.2 mm. The film was measured for the tensile modulus, the permanent elongation, and the thermal stability. These results are summarized in Table 2. The film was specifically formed under the following conditions:

composition process speed: 15 kg/hr
film take-up rate: 10 m/min
extruder temperature: inlet: 200° C., T-die: 220° C.
screw: full flight
extruder L/D: 42
T-die: width: 300 mm, lip: 1 mm Example 2

A hydrogenated block copolymer composition was prepared in the same manner as in Example 1 except that the reaction time of the hydrogenation was changed from 3 hours to 1 hour. Pellets and a film were formed from the resulting hydrogenated block copolymer composition in the same manner as in Example 1, and the measurements were performed in the same manner as in Example 1. The results are summarized in Table 2.

Example 3

A hydrogenated block copolymer composition was prepared in the same manner as in Example 1 except that the amounts of styrene, dibutyl ether, n-butyllithium, isoprene, and methanol were varied as shown in Table 1 and the reaction time of the hydrogenation was changed from 3 hours to 15 minutes. Pellets and a film were formed from the resulting hydrogenated block copolymer composition in the same manner as in Example 1, and the measurements were performed in the same manner as in Example 1. The results are summarized in Table 2.

Example 4

A hydrogenated block copolymer composition was prepared in the same manner as in Example 1 except that the amounts of styrene, dibutyl ether, n-butyllithium, isoprene, and methanol were varied as shown Table 1 and the reaction time in the hydrogenation was changed from 3 hours to 2 hours. Pellets and a film were formed from the resulting hydrogenated block copolymer composition in the same manner as in Example 1, and the measurements were performed in the same manner as in Example 1. The results are summarized in Table 2.

Example 5

(1) Preparation of Block Copolymer Composition Before Hydrogenation 56.6 kg of cyclohexane, 523 mmol of dibutyl ether, and 0.69 kg of styrene were added to a pressure-resistant reactor. While the system was being stirred at 40° C., 280.2 mmol of n-butyllithium (1.6 M solution) was added. After the addition was completed, the system was heated to 50° C., followed by a polymerization reaction for 1 hour (first stage of polymerization). The polymerization conversion ratio of styrene at this time was 100% by weight.

Subsequently, while the temperature was being controlled to keep 50 to 60° C., 7.99 kg of isoprene was continuously added to the reactor over 1 hour. The addition of isoprene was completed, followed by polymerization for another one hour (second stage of polymerization). The polymerization conversion ratio of isoprene at this time was 100%.

In the next step, 101 mmol of dimethyldichlorosilane as a bifunctional coupling agent was added and mixed to couple a portion of the terminally active styrene-isoprene-styrene triblock copolymer, thereby preparing a solution containing a styrene-isoprene-styrene triblock copolymer which corresponds to a block copolymer B' for preparing a hydrogenated block copolymer B.

Thereafter, while the temperature was further successively being controlled to keep 50 to 60° C., 0.61 kg of styrene was continuously added over 1 hour. The addition of styrene was completed, followed by polymerization for another one hour to prepare a solution containing a terminally active styrene-isoprene-styrene triblock copolymer which corresponds to a block copolymer A' for preparing a hydrogenated block copolymer A (third stage of polymerization). The polymerization conversion ratio of styrene at this time was 100%.

Finally, the active terminal of the terminally active styrene-isoprene-styrene triblock copolymer was completely inactivated by adding and mixing 358 mmol of methanol as a polymerization terminator, to complete the polymerization reaction. Thereby, a solution containing a block copolymer composition before hydrogenation was prepared.

The amounts of the reaction agents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation was performed under the same conditions as those in Example 1. A portion of the resulting solution containing a hydrogenated block copolymer composition was extracted, and the measurements were performed in the same manner as in Example 1. The results are summarized in Table 2.

(3) Recovery and Formation of Hydrogenated Block Copolymer Composition Recovery from the resulting solution containing a hydrogenated block copolymer composition was performed in the same manner as in Example 1. Thereafter, pellets and a film were formed in the same manner as in Example 1, and the measurements were performed in the same manner as in Example 1. The results are summarized in Table 2.

Example 6

A hydrogenated block copolymer composition was prepared in the same manner as in Example 1 except that dibutyl ether was replaced by 270.6 mmol of ethylene glycol dibutyl ether. Pellets and a film were formed from the resulting hydrogenated block copolymer composition in the same manner as in Example 1, and the measurements were performed in the same manner as in Example 1. The results are summarized in Table 2.

Example 7

A hydrogenated block copolymer composition was prepared in the same manner as in Example 6 except that the amount of ethylene glycol dibutyl ether was changed to 1353 mmol. Pellets and a film were formed from the resulting hydrogenated block copolymer composition in the same manner as in Example 6, and the measurements were performed in the same manner as in Example 6. The results are summarized in Table 2.

Example 8

A hydrogenated block copolymer composition was prepared in the same manner as in Example 6 except that the amount of ethylene glycol dibutyl ether was changed to 2706 mmol. Pellets and a film were formed from the resulting hydrogenated block copolymer composition in the same manner as in Example 6, and the measurements were performed in the same manner as in Example 6. The results are summarized in Table 2.

Example 9

A hydrogenated block copolymer composition was prepared in the same manner as in Example 6 except that the amount of ethylene glycol dibutyl ether was changed to 4059 mmol. Pellets and a film were formed from the resulting hydrogenated block copolymer composition in the same manner as in Example 6, and the measurements were performed in the same manner as in Example 6. The results are summarized in Table 2.

Comparative Example 1

(1) Preparation of Block Copolymer Composition Before Hydrogenation 56.6 kg of cyclohexane, 517 mmol of dibutyl ether, and 1.5 kg of styrene were added to a pressure-resistant reactor. While the system was being stirred at 40° C., 277.5 mmol of n-butyllithium (1.6 M solution) was added. After the addition was completed, the system was heated to 50° C. and polymerized for 1 hour (first stage of polymerization). The polymerization conversion ratio of styrene at this time was 100% by weight.

Subsequently, while the temperature was being controlled to keep 50 to 60° C., 6.99 kg of isoprene was continuously added to the reactor over 1 hour. The addition of isoprene was completed, followed by polymerization for another one hour (second stage of polymerization). The polymerization conversion ratio of isoprene at this time was 100%.

In the next step, while the temperature was being controlled to keep 50 to 60° C., 1.5 kg of styrene was continuously added over 1 hour. The addition of styrene was completed, followed by polymerization for another one hour to prepare a solution containing a terminally active styrene-isoprene-styrene triblock copolymer (third stage of polymerization). The polymerization conversion ratio of styrene at this time was 100%.

Finally, the active terminal of the terminally active styrene-isoprene-styrene triblock copolymers was completely inactivated by adding and mixing 555 mmol of methanol as a polymerization terminator, to complete the polymerization reaction. Thereby, a solution containing a block copolymer composition before hydrogenation was prepared.

The amounts of the reaction agents used in the reactions are summarized in Table 1.

(2) Hydrogenation of Block Copolymer Composition Before Hydrogenation

The resulting solution containing a block copolymer composition before hydrogenation was hydrogenated to prepare a solution containing a hydrogenated block copolymer composition. The hydrogenation was performed under the same conditions as those in Example 1. A portion of the resulting solution containing a hydrogenated block copolymer composition was extracted, and the measurements were performed in the same manner as in Example 1. The results are summarized in Table 2.

(3) Recovery and Formation of Hydrogenated Block Copolymer Composition

Recovery from the resulting solution containing a hydrogenated block copolymer composition was performed in the same manner as in Example 1. Thereafter, pellets and a film were formed in the same manner as in Example 1, and the measurements were performed in the same manner as in Example 1. The results are summarized in Table 2.

Comparative Example 2

A hydrogenated block copolymer composition was prepared in the same manner as in Comparative Example 1 except that the reaction time of the hydrogenation was changed from 3 hours to 20 minutes. Pellets and a film were formed from the resulting hydrogenated block copolymer composition in the same manner as in Comparative Example 1, and the measurements were performed in the same manner as in Comparative Example 1. The results are summarized in Table 2.

Comparative Examples 3 and 4

An unhydrogenated block copolymer composition was prepared in the same manner as in Example 1 except that the amounts of styrene, dibutyl ether, n-butyllithium, isoprene, and methanol were varied as shown in Table 1 and the hydrogenation was not performed. Pellets and a film were formed from the unhydrogenated block copolymer composition in the same manner as in Example 1, and the measurements were performed in the same manner as in Example 1. The results are summarized in Table 2.

Comparative Example 5

An unhydrogenated block copolymer composition was prepared in the same manner as in Comparative Example 1 except that the amounts of styrene, dibutyl ether, n-butyllithium, isoprene, and methanol were varied as shown in Table 1 and the hydrogenation was not performed. Pellets and a film were formed from the unhydrogenated block copolymer composition in the same manner as in Comparative Example 1, and the measurements were performed in the same manner as in Comparative Example 1. The results are summarized in Table 2.

TABLE 1

|  |  | Example | | | | | | | | |
|---|---|---|---|---|---|---|---|---|---|---|
|  |  | 1 | 2 | 3 | 4 | 5 | 6 | 7 | 8 | 9 |
| Cyclohexane (kg) |  | 56.6 | 56.6 | 56.6 | 56.6 | 56.6 | 56.6 | 56.6 | 56.6 | 56.6 |
| Dibutyl ether (mmol) |  | 505 | 505 | 510 | 514 | 523 | — | — | — | — |
| Ethylene glycol dibutyl ether (mmol) |  | — | — | — | — | — | 270.6 | 1353 | 2706 | 4059 |
| n-Butyllithium (mmol) |  | 270.6 | 270.6 | 273.4 | 275.4 | 280.2 | 270.6 | 270.6 | 270.6 | 270.6 |
| Styrene (kg) | [1st stage of polymerization] | 1.22 | 1.22 | 1.02 | 0.97 | 0.69 | 1.22 | 1.22 | 1.22 | 1.22 |
| Isoprene (kg) | [2nd stage of polymerization] | 6.49 | 6.49 | 5.00 | 7.30 | 7.99 | 6.49 | 6.49 | 6.49 | 6.49 |
| Dimethyldichlorosilane (mmol) | [Added after 2nd stage of polymerization] | — | — | — | — | 101 | — | — | — | — |
| Styrene (kg) | [3rd stage of polymerization] | 1.22 | 1.22 | 1.02 | 0.97 | 0.61 | 1.22 | 1.22 | 1.22 | 1.22 |
| Methanol (mmol) | [Added after 3rd stage of polymerization] | 195 | 195 | 197 | 198 | 358 | 195 | 195 | 195 | 195 |
| Styrene (kg) | [4th stage of polymerization] | 1.06 | 1.06 | 2.95 | 0.76 | — | 1.06 | 1.06 | 1.06 | 1.06 |
| Methanol (mmol) | [Added after 4th stage of polymerization] | 345 | 345 | 350 | 353 | — | 345 | 345 | 345 | 345 |

|  |  | Comparative Example | | | | |
|---|---|---|---|---|---|---|
|  |  | 1 | 2 | 3 | 4 | 5 |
| Cyclohexane (kg) |  | 56.6 | 56.6 | 56.6 | 56.6 | 56.6 |
| Dibutyl ether (mmol) |  | 517 | 517 | 301 | 370 | 327 |
| Ethylene glycol dibutyl ether (mmol) |  | — | — | — | — | — |
| n-Butyllithium (mmol) |  | 277.5 | 277.5 | 161.6 | 198.9 | 175.3 |
| Styrene (kg) | [1st stage of polymerization] | 1.5 | 1.5 | 1.26 | 0.97 | 1.75 |
| Isoprene (kg) | [2nd stage of polymerization] | 6.99 | 6.99 | 6.49 | 5.00 | 6.49 |
| Dimethyldichlorosilane (mmol) | [Added after 2nd stage of polymerization] | — | — | — | — | — |
| Styrene (kg) | [3rd stage of polymerization] | 1.5 | 1.5 | 1.26 | 0.97 | 1.75 |
| Methanol (mmol) | [Added after 3rd stage of polymerization] | — | — | 113 | 143 | — |
| Styrene (kg) | [4th stage of polymerization] | — | — | 0.97 | 3.05 | — |
| Methanol (mmol) | [Added after 4th stage of polymerization] | 555 | 555 | 210 | 255 | 351 |

TABLE 2

|  | Example | | | | | | | | |
|---|---|---|---|---|---|---|---|---|---|
|  | 1 | 2 | 3 | 4 | 5 | 6 | 7 | 8 | 9 |
| (Hydrogenated) block copolymer A | | | | | | | | | |
| Weight average molecular weight [Mw ($Ar1^a$)] of relatively small styrene block ($Ar1^a$) | 5000 | 5000 | 4000 | 3700 | 2500 | 5000 | 5000 | 5000 | 5000 |
| Weight average molecular weight [Mw ($Ar2^a$)] of relatively large styrene block ($Ar2^a$) | 25000 | 25000 | 57000 | 18000 | 12500 | 24500 | 24000 | 23500 | 23000 |
| Mw($Ar2^a$)/Mw($Ar1^a$) | 5.0 | 5.0 | 14.3 | 4.9 | 5.0 | 4.9 | 4.8 | 4.7 | 4.6 |
| Weight average molecular weight [Mw ($HD^a$)] of (hydrogenated) isoprene block | 38000 | 38000 | 30000 | 41000 | 42500 | 38000 | 38000 | 38000 | 38000 |
| Vinyl bond content (%) in (hydrogenated) isoprene block | 7 | 7 | 7 | 7 | 7 | 30 | 50 | 70 | 80 |
| Styrene unit content (%) in (hydrogenated) block copolymer A | 27 | 27 | 29 | 21 | 14.8 | 27 | 27 | 27 | 27 |
| (Hydrogenated) block copolymer B | | | | | | | | | |
| Weight average molecular weight [Mw ($Ar1^b$) = Mw ($Ar2^b$)] of (hydrogenated) styrene block | 5000 | 5000 | 4000 | 3700 | 2500 | 5000 | 5000 | 5000 | 5000 |

TABLE 2-continued

| | | | | | | | | | |
|---|---|---|---|---|---|---|---|---|---|
| Weight average molecular weight [Mw (HD$^b$)] of (hydrogenated) isoprene block | 38000 | 38000 | 30000 | 41000 | 42500 | 37000 | 36500 | 36000 | 35500 |
| Vinyl bond content (%) in (hydrogenated) isoprene block | 7 | 7 | 7 | 7 | 7 | 30 | 50 | 70 | 80 |
| Styrene unit content (%) in (hydrogenated) block copolymer B | 53 | 53 | 75.6 | 42.5 | 34.2 | 53 | 53 | 53 | 53 |
| (Entire) block copolymer composition | | | | | | | | | |
| Weight average molecular weight | 52000 | 52000 | 58000 | 50000 | 49000 | 71500 | 70500 | 69500 | 68500 |
| Molecular weight distribution | 1.031 | 1.030 | 1.033 | 1.032 | 1.032 | 1.032 | 1.035 | 1.04 | 1.041 |
| Styrene unit content (%) | 35 | 35 | 50 | 27 | 20 | 35 | 35 | 35 | 35 |
| (Hydrogenated) block copolymer A/ (Hydrogenated) block copolymer B (weight ratio) | 30/70 | 30/70 | 45/55 | 27/73 | 15/85 | 30/70 | 30/70 | 30/70 | 30/70 |
| Hydrogenation ratio (mol %) of olefins | 100 | 50 | 20 | 80 | 100 | 100 | 100 | 100 | 100 |
| Iodine value (gI$_2$/100 g) | 0 | 121.0 | 148.8 | 54.3 | 0 | 0 | 0 | 0 | 0 |
| Physical properties of film | | | | | | | | | |
| 50% tensile modulus (MPa) | 3.72 | 2.44 | 5.11 | 3.01 | 3.11 | 4.12 | 4.5 | 4.83 | 5.02 |
| Permanent elongation (%) | 4 | 3 | 8 | 2 | 2 | 8 | 10 | 18 | 19 |
| Thermal stability | | | | | | | | | |
| Viscosity retention (%) after heating at 170° C., 1 h | 100 | 92 | 87 | 97 | 99 | 100 | 100 | 100 | 100 |

| | Comparative Example | | | | |
|---|---|---|---|---|---|
| | 1 | 2 | 3 | 4 | 5 |
| (Hydrogenated) block copolymer A | | | | | |
| Weight average molecular weight [Mw (Ar1$^a$)] of relatively small styrene block (Ar1$^a$) | — | — | 8000 | 5000 | — |
| Weight average molecular weight [Mw (Ar2$^a$)] of relatively large styrene block (Ar2$^a$) | — | — | 40000 | 80000 | — |
| Mw(Ar2$^a$)/Mw (Ar1$^a$) | — | — | 5.0 | 16.0 | — |
| Weight average molecular weight [Mw (HD$^a$)] of (hydrogenated) isoprene block | — | — | 64000 | 40000 | — |
| Vinyl bond content (%) in (hydrogenated) isoprene block | — | — | 7 | 7 | — |
| Styrene unit content (%) in (hydrogenated) block copolymer A | — | — | 28 | 28 | — |
| (Hydrogenated) block copolymer B | | | | | |
| Weight average molecular weight [Mw (Ar1$^b$) = Mw (Ar2$^b$)] of (hydrogenated) styrene block | 3000 | 3000 | 8000 | 5000 | 24000 |
| Weight average molecular weight [Mw (HD$^b$)] of (hydrogenated) isoprene block | 44000 | 44000 | 64000 | 40000 | 64000 |
| Vinyl bond content (%) in (hydrogenated) isoprene block | 7 | 7 | 7 | 7 | 7 |
| Styrene unit content (%) in (hydrogenated) block copolymer B | 30 | 30 | 52 | 76 | 35 |
| (Entire) block copolymer composition | | | | | |
| Weight average molecular weight | 50000 | 50000 | 88000 | 82000 | 88000 |
| Molecular weight distribution | 1.014 | 1.012 | 1.032 | 1.033 | 1.012 |
| Styrene unit content (%) | 30 | 30 | 35 | 50 | 35 |
| (Hydrogenated) block copolymer A/ (Hydrogenated) block copolymer B (weight ratio) | — | — | 30/70 | 45/55 | — |
| Hydrogenation ratio (mol %) of olefins | 100 | 30 | 0 | 0 | 0 |
| Iodine value (gI$_2$/100 g) | 0 | 182.3 | 241.9 | 186 | 241.9 |
| Physical properties of film | | | | | |
| 50% tensile modulus (MPa) | 4.21 | 3.21 | 1.21 | 3.71 | 3.92 |
| Permanent elongation (%) | 40 | 25 | 2 | 3 | 30 |
| Thermal stability | | | | | |
| Viscosity retention (%) after heating at 170° C., 1 h | 100 | 88 | 32 | 39 | 34 |

Table 1 shows that using the hydrogenated block copolymer compositions each comprising the hydrogenated block copolymer A represented by General Formula (A) and the hydrogenated block copolymer B represented by General Formula (B) in A/B (weight ratio)=10/90 to 80/20 and having a hydrogenation ratio of olefins of 10 to 100% in the polymer components constituting the hydrogenated block copolymer composition, a high 50% tensile modulus, small permanent elongation, high viscosity retention after 1-hour heating at 170° C., and high thermal stability were achieved (Examples 1 to 9).

In contrast, in the case where the hydrogenated block copolymer A represented by General Formula (A) was not contained, the permanent elongation was large while thermal stability was high (Comparative Examples 1 and 2).

In the case where the hydrogenation ratio of olefins was less than 10%, the viscosity retention after 1-hour heating at 170° C. was low and thermal stability was reduced (Comparative Examples 3 and 4).

Furthermore, in the case where the hydrogenated block copolymer A represented by General Formula (A) was not contained and the hydrogenation ratio of olefins was less than 10%, the permanent elongation was large, the viscosity retention after 1-hour heating at 170° C. was low, and thermal stability was reduced (Comparative Example 5).

The invention claimed is:

1. A hydrogenated block copolymer composition comprising a hydrogenated block copolymer A represented by General Formula (A) and a hydrogenated block copolymer B represented by General Formula (B),
wherein the weight ratio (A/B) of the hydrogenated block copolymer A to the hydrogenated block copolymer B is 10/90 to 45/55, and
the hydrogenation ratio of olefins in the polymer components constituting the hydrogenated block copolymer composition is 10 to 100%:

$$Ar1^{a}\text{-}HD^{a}\text{-}Ar2^{a} \qquad (A)$$

$$Ar1^{b}\text{-}HD^{b}\text{-}Ar2^{b} \qquad (B)$$

where in General Formulae (A) and (B) above, $Ar1^{a}$, $Ar2^{a}$, $Ar1^{b}$, and $Ar2^{b}$ are each an aromatic vinyl polymer block, $HD^{a}$ and $HD^{b}$ are each a hydrogenated polymer block of a conjugated diene polymer having a vinyl bond content of 1 to 20 mol %, and the ratio $(Mw(Ar2^{a})/Mw(Ar1^{a}))$ of the weight average molecular weight of $Ar2^{a}$ ($Mw(Ar2^{a})$) to the weight average molecular weight of $Ar1^{a}$ ($Mw(Ar1^{a})$) is 2.6 to 66.

2. The hydrogenated block copolymer composition according to claim 1, wherein the proportion of aromatic vinyl monomer units is 20 to 70% by weight in the total repeating units of the polymer components in the hydrogenated block copolymer composition.

3. The hydrogenated block copolymer composition according to claim 1, wherein in General Formulae (A) and (B) above, $Ar1^{a}$, $Ar1^{b}$, and $Ar2^{b}$ each have a weight average molecular weight in the range of 2,000 to 40,000, and $HD^{a}$ and $HD^{b}$ each have a weight average molecular weight in the range of 15,000 to 300,000.

4. A method for producing the hydrogenated block copolymer composition according to claim 1, the method comprising (1) to (7):

(1): preparing a solution containing a terminally active aromatic vinyl polymer by polymerizing an aromatic vinyl monomer in a solvent in the presence of a polymerization initiator;

(2): preparing a solution containing a terminally active aromatic vinyl-conjugated diene block copolymer by adding a conjugated diene monomer to the solution containing a terminally active aromatic vinyl polymer prepared in (1), and polymerizing the conjugated diene monomer;

(3): preparing a solution containing a terminally active aromatic vinyl-conjugated diene-aromatic vinyl block copolymer by adding an aromatic vinyl monomer to the solution containing a terminally active aromatic vinyl-conjugated diene block copolymer prepared in (2), and polymerizing the aromatic vinyl monomer;

(4): preparing a solution containing a block copolymer B' by adding a polymerization terminator to the solution containing a terminally active aromatic vinyl-conjugated diene-aromatic vinyl block copolymer, which is prepared in (3), in an amount of less than 1 molar equivalent relative to the active terminal of the terminally active aromatic vinyl-conjugated diene-aromatic vinyl block copolymer to inactivate a portion of the active terminal;

(5): preparing a solution containing the block copolymer B' and a block copolymer A' by adding an aromatic vinyl monomer to the solution containing a block copolymer B' prepared in (4), and polymerizing the aromatic vinyl monomer;

(6): preparing a solution containing a hydrogenated block copolymer B and a hydrogenated block copolymer A by hydrogenating the solution containing the block copolymer B' and a block copolymer A' prepared in (5); and (7): recovering a hydrogenated block copolymer composition from the solution containing a hydrogenated block copolymer B and a hydrogenated block copolymer A prepared in (6).

5. A method for producing the hydrogenated block copolymer composition according to claim 1, the method comprising (1a) to (6a):

(1a): preparing a solution containing a terminally active aromatic vinyl polymer by polymerizing an aromatic vinyl monomer in a solvent in the presence of a polymerization initiator;

(2a): preparing a solution containing a terminally active aromatic vinyl-conjugated diene block copolymer by adding a conjugated diene monomer to the solution containing a terminally active aromatic vinyl polymer prepared in (1a), and polymerizing the conjugated diene monomer;

(3a): preparing a solution containing a block copolymer B' by adding a bifunctional coupling agent to the solution containing a terminally active aromatic vinyl-conjugated diene block copolymer, which is prepared in (2a), in an amount such that the total amount of the functional groups is less than 1 molar equivalent relative to the active terminal thereof, to couple a portion of the terminally active aromatic vinyl-conjugated diene block copolymer;

(4a): preparing a solution containing the block copolymer B' and a block copolymer A' by adding an aromatic vinyl monomer to the solution containing a block copolymer B' prepared in (3a), and polymerizing the aromatic vinyl monomer;

(5a): preparing a solution containing a hydrogenated block copolymer B and a hydrogenated block copolymer A by hydrogenating the solution containing the block copolymer B' and a block copolymer A' prepared in (4a); and (6a): recovering a hydrogenated block copolymer composition from the solution containing a hydrogenated block copolymer B and a hydrogenated block copolymer A prepared in (5a).

6. A film formed from the hydrogenated block copolymer composition according to claim 1.

7. The hydrogenated block copolymer composition according to claim 1, wherein the weight ratio (A/B) of the hydrogenated block copolymer A to the hydrogenated block copolymer B is 10/90 to 30/70.

* * * * *